May 27, 1941.   E. H. HALL   2,243,206
CLUTCH CONTROLLED DIE PRESS OR THE LIKE
Filed May 9, 1940   3 Sheets-Sheet 3
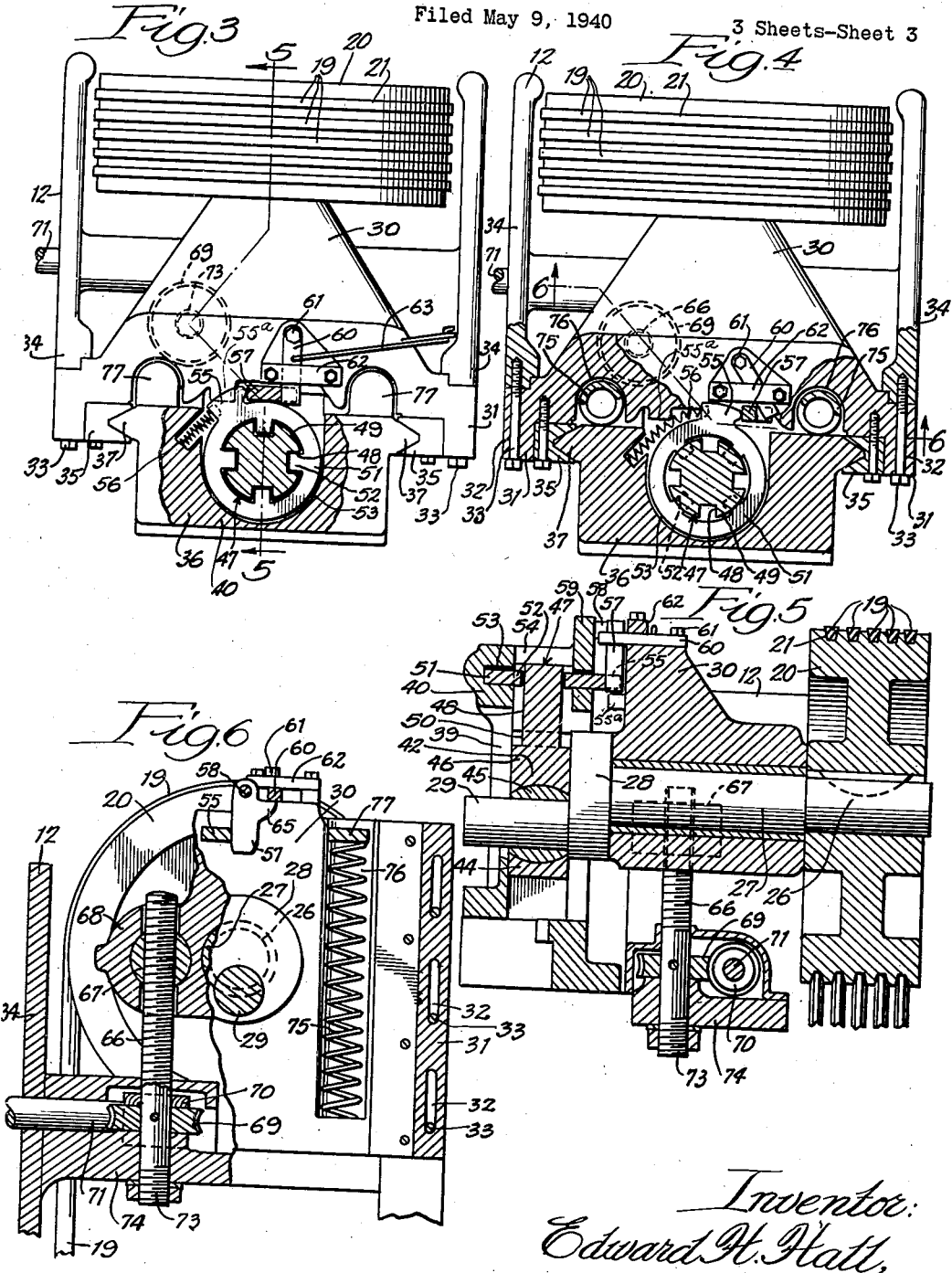
Inventor:
Edward H. Hall,
By Cumming & Cumming
Attorneys Patented May 27, 1941

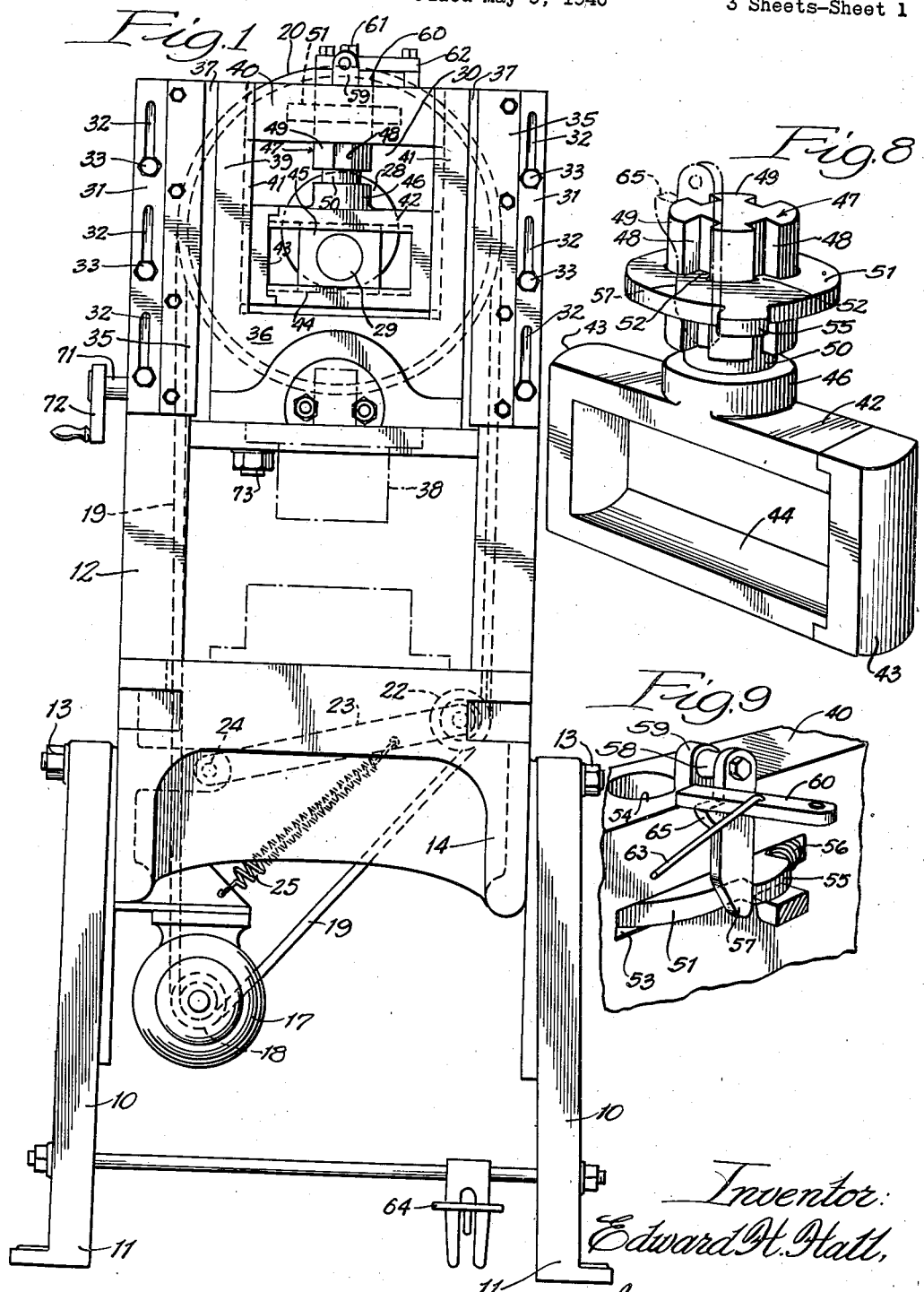

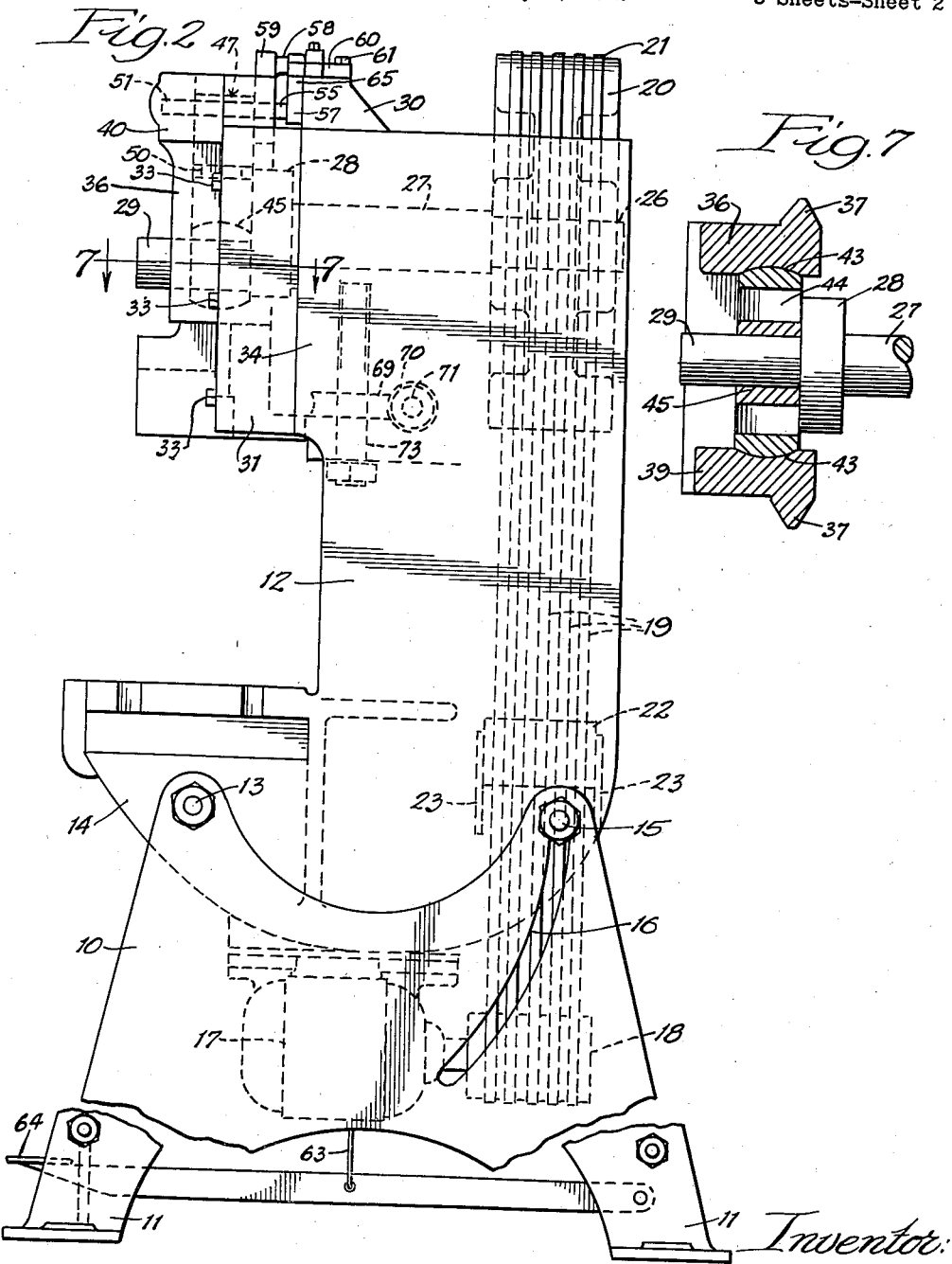

2,243,206

UNITED STATES PATENT OFFICE 2,243,206

CLUTCH CONTROLLED DIE PRESS OR THE LIKE

Edward H. Hall, Chicago, Ill.

Application May 9, 1940, Serial No. 334,115

19 Claims. (Cl. 74—50)

The present invention is directed to a die press or similar mechanism in which a reciprocating element is constantly driven by suitable power transmission connections and in which it is necessary at recurrent intervals to engage the reciprocating element with a die head or the like which carries the punch tool or equivalent to perform work for which the mechanism is intended. In such circumstances it is highly important to effect clutching engagement between the constantly operating element and the recurrently actuated mechanism in such a way as to avoid undue wear or breakage of parts occasioned by the sudden clutching together of the mechanisms, and the present invention is particularly designed with this end in view. It therefore becomes necessary to make provision for clutch engaging the reciprocating element at the instant of time when it reverses its direction of movement and before it acquires momentum in the reverse direction.

Although the present invention comprises the entire punch press or the like, the clutch elements constitute the most important features of the complete structure, and since the use of such clutch elements is not necessarily confined to a punch press of the character to be hereinafter described, it will be understood that claim is also made to such clutch mechanisms irrespective of the particular type of machinery into which they may be incorporated.

Further objects and details will appear from the description of the invention in conjunction with the accompanying drawings, wherein, Figure 1 is a front elevation of a punch press embodying the features of the present invention;

Fig. 2 is a side elevation thereof;

Figs. 3 and 4 are top views of the punch press showing portions thereof in section to reveal the clutch mechanism in two positions of its adjustment;

Fig. 5 is a sectional elevation taken on line 5—5 of Fig. 3;

Fig. 6 is a view taken on the offset section line 6—6 of Fig. 4;

Fig. 7 is a sectional detail taken on line 7—7 of Fig. 2;

Fig. 8 is a perspective view of the clutch mechanism and associated parts; and

Fig. 9 is a perspective view of the latch mechanism for controlling the clutch plate.

The machine as a whole comprises a base frame consisting of spaced standards 10—10 supported upon legs 11. Between the standards is mounted a main frame 12 of C-shaped formation which is tiltably mounted upon a cross rod 13 which passes through the forwardly projecting platform 14 of the main frame, which may be tilted and held in adjusted position by lock bolts 15 entered through arcuate slots 16 in the standards.

The lower end of the main frame is of rounded formation and suspends a motor 17 having a driving pulley 18 on the motor shaft. The driving pulley is grooved to mount a plurality of V-shaped drive belts 19, which are carried around the periphery of a fly wheel 20 having grooves 21 to receive the belts.

In order to widely space the turns of the belts and thus clear the interior of the machine, a tensioning idler pulley 22 is provided which is mounted upon an arm 33 pivoted at its opposite end 24 to the main frame near one side thereof and drawn downwardly under the tension of a spring 25. The arrangement is one which spreads the turns of the belts to the degree required to maintain them in parallelism with one another and holds them under tension irrespective of slight vertical adjustments in the position of the fly wheel, for which provision is made.

The fly wheel occupies a position at the upper rear portion of the main frame being keyed upon the reduced end 26 of a shaft 27, which extends from front to rear of the machine and carries a crank head 28 at its forward end from which a crank arm 29 projects forwardly in eccentric relation to the axis of the shaft.

The shaft is journalled through a head casting 30 which is provided on each side along its edge with a forwardly projecting marginal rib 31 provided with a series of aligned slots 32 which receive bolts 33 entered into the front edges of the upper side walls 34 of the main frame. This arrangement permits the head casting with the fly wheel to be given a limited vertical adjustment between the side walls of the frame.

Immediately adjacent the marginal ribs 31 are located guide bars 35 grooved on their opposed inner edges to furnish a guideway for the reciprocation of a plunger head 36 provided on each side with a rib 37 which slidably engages the groove in the associated guide bar. The plunger head 36 carries a tool 38, such as a punch or the equivalent.

The plunger head 36 is in the form of an open rectangular frame having side standards 39 connected at the top by a bridge 40. The inner faces 41 of the standards 39 are concavely grooved to afford a guideway for the reciprocating frame 42 the ends 43 of which are convexly rounded to fit within the grooved faces 41. The upper and lower rails of the reciprocating frame 42 are concavely grooved on their inner faces 44 to provide a guideway for a transversely reciprocating block 45 through which the crank arm 29 is entered. The reciprocating frame is provided on its top with an upstanding boss 46 which carries a clutch head 47 which will be hereinafter described in detail.

The arrangement thus far described is such that the continuous rotation of the fly wheel will impart an orbital travel to the crank arm 29, which through the medium of the reciprocating block 45 will impart vertical reciprocating movements to the frame 42 which carries the clutch head 47 so that the latter may reciprocate freely without transmitting movements to the plunger head 36.

The clutch head 47 is of generally cylindrical formation and provided with a plurality of longitudinal grooves 48 which extend from end to end thereof and are separated by intervening ribs 49, which ribs terminate above the boss 46, thereby affording an unobstructed circumferential channel 50 around the clutch head.

The reciprocating clutch head coacts with a clutch plate 51 provided with a central aperture of complementary form to the grooved clutch head, which affords spaced inwardly projecting tongues 52 which, when the parts are in unclutched relation, project into the grooves 48 of the clutch head 47, as illustrated in Fig. 8.

The clutch plate 51 is rotatably mounted but held against vertical displacement, and when the clutch head rises to the upper limit of its reciprocation the groove 50 will register with the clutch plate, which will thus permit the latter to be turned at the instant of reversal of movement, so as to bring the tongues 52 beneath the ribs 49 on the clutch head, so that as the clutch head descends the clutch plate 51 will stand in clutched relation to the clutch head and descend with it.

As best shown in Figs. 3 and 4, the clutch plate 51 is mounted within a recess 53 in the top of the bridge 40 of the plunger (Fig. 5), which bridge is provided with an aperture 54 to afford clearance for reciprocation of the clutch head 47.

The clutch plate 51 is provided on one side with an outwardly projecting lug 55, and when the parts are in unclutched relation the lug will occupy the position shown in Fig. 3 and compress a backing spring 56 socketed within the bridge 40. In this position the tongues 52 will enter the grooves 48, permitting the clutch head to reciprocate freely without engaging the clutch plate 51. However, when the lug 55 is released, the spring 56 will instantly turn the clutch plate to the position shown in Fig. 4, which brings the tongues 53 beneath the ribs 49, as indicated in dotted lines, so that clutching of the parts will be effected.

The clutch plate 51 is so positioned that rotary movement thereof cannot be effected until the clutch head has risen to the limit of its upward stroke, at which instant the groove 50 will register with the edge of the clutch plate so that the spring will be free to act and snap the plate into clutch engaging position in the pause before the clutch head begins its downward reciprocation and the parts acquire momentum. The lug 55 overlies a lug 55ª on the head casting 30, which prevents any downward movement of the clutch plate due to accidental gripping of the clutch elements which might otherwise be imparted to the plunger even though the clutch plate remained in unclutching position.

In order to regulate the tripping of the clutch plate at the proper instant, a trip finger 57 (Fig. 9) is provided, which is pivoted at its upper end to an arm 58 outwardly projecting from a lug 59 on the bridge 40 of the plunger head. The trip finger normally occupies a position in advance of the spring-backed lug 55 on the clutch plate so as to hold the same in non-clutching relation to the reciprocating clutch head 47. The trip finger is held in this position by the contact of a lever 60 pivoted at its outer end on a pin 61 entered into the top of the head casting 30 and held beneath a guide bar 62, which permits it to swing from the position shown in Fig. 3 to the position shown in Fig. 4 under the pull of a draw rod 63 having suitable connection with a foot treadle 64 in the base of the machine.

The trip finger 57 is provided with a projection 65 which underlies the lever 60, the arrangement being such that when the foot treadle is depressed and the draw rod drawn forward, the lever will release the trip finger and allow the tension of the spring 56 to instantly rotate the clutch plate 51 as soon as the reciprocating clutch head 47 rises to the end of its stroke and brings the clutch plate into register with the groove or channel 50. Up to this point, however, even after the retraction of the trip finger, the clutch plate will be held against rotation by the engagement of the tongues 52 with the grooves 48; but as soon as the clutching is effected the plunger head will descend and carry with it the trip finger 57 below the level of the lever 60. If during such reciprocation the lever 60 is restored to the position shown in Fig. 9 by the release of the foot treadle 64, it will act at the proper instant to force back the trip finger and with it the clutch plate into clutch releasing position and restore the parts to the condition illustrated in Fig. 9. However, so long as the foot treadle remains depressed, the clutch relation will be maintained.

In order to provide for a limited vertical adjustment of the head casting 30, with the grooved fly wheel and shaft carried thereby, a vertically disposed adjusting screw 66 is provided, which is threaded through a bearing block 67 carried by a lug 68 outwardly projecting from one side of the head casting (see Figs. 5 and 6), which screw is provided with a worm wheel 69 in mesh with a worm 70 on a shaft 71 carrying a hand wheel 72. The lower end 73 of the adjusting screw is unthreaded and is entered through a cross bar 74 forming part of the fixed frame of the machine.

In order to cushion the strokes of the plunger 36, a pair of heavy coil springs 75 are provided, which are socketed within recesses 76 in the face of the head casting 30 and are contacted by lugs 77 rearwardly projecting from the plunger head.

*Operation*

The fly wheel will be constantly driven by the motor and transmission belts, and so long as the clutch plate stands in non-engaging relation to the reciprocating clutch head, no motion will be imparted to the plunger head. When the trip finger is drawn back to release the clutch plate, the latter will be restrained from movement until the end of the reciprocating stroke, at which instant it will, under spring tension, snap around into position to underlie and engage with the ribs 49 of the clutch head, which engagement, however, will occur during the minute pause in the reversal of the direction of movement, so that the parts will be effectively clutched together during this interval and relieved from the possibility of wear and breakage occasioned by the clutching together of moving parts subjected to heavy momentum.

Although the clutch mechanism has particular advantage in association with the plunger head of a punch press or the like, it will be understood that its use is not confined to mechanism of this character, nor to mechanism in which the parts move in a straight line of reciprocation, since a clutch plate of the character described might equally well be employed in connection with members which reverse direction in an oscillating movement, and wherein the clutching occurs during the pause in the reversal of the oscillation or under other circumstances of like or similar character.

It will be understood that although in the present embodiment the clutch plate is rotatable as a whole at the end of the reciprocation of the clutch head, a portion only of the structure might be made rotatable to secure clutching engagement with the clutch head, and modifications of this character are regarded as within the scope of the present invention.

It will also be understood that relative movement between the clutch head and the clutch plate, both in a longitudinal and in a rotary direction rather than absolute movement, is contemplated, and that modifications in the form and groove arrangement of the inter-engaging parts are within the scope of the present invention.

I claim:

1. In clutch mechanism of the class described, the combination of a clutch plate and a clutch head having relative movement longitudinally of the clutch head and configured to freely interengage with one another to permit such relative movement, the parts being so configured as to permit relative rotary movement between the clutch head and the clutch plate at a predetermined point in said first mentioned movement and adapted when so turned to prevent relative longitudinal movement and cause the parts to move in unison.

2. In clutch mechanism of the class described, the combination of an elongated clutch head and a surrounding clutch plate having interengaging relation to one another to permit free relative movement longitudinally of the clutch head, and the parts being configured to permit relative rotary movement between the clutch head and the clutch plate when said parts have reached a predetermined position with respect to one another to bring the parts into interlocking relation to compel movement in unison therebetween.

3. In clutch mechanism of the class described, the combination of an elongated clutch head and a surrounding relatively flat clutch plate, the parts being grooved relatively to one another to permit movement longitudinally of the head and maintain the parts in engaging relation during such movement, said grooving being terminated at a predetermined point to free the parts from such engaging relation and permit relative rotary movement to be imparted thereto to bring the clutch head and plate into clutching relation to compel movement in unison.

4. In clutch mechanism of the class described, the combination of an elongated clutch head provided with longitudinally extending grooves and a surrounding clutch plate having members engaging said grooves to permit relative longitudinal movement between said parts and prevent relative rotary movement thereof, said grooves terminating at a predetermined point to release the engagement thus afforded and permit relative rotary movement between the clutch head and plate to bring the same into clutching relation with one another to compel movement in unison.

5. In clutch mechanism of the class described, the combination of an elongated clutch head provided with longitudinally extending grooves and a surrounding clutch plate having members engaging said grooves to permit relative longitudinal movement between said parts and prevent relative rotary movement thereof, said grooves terminating at a predetermined point to release the engagement thus afforded and permit relative rotary movement between the clutch head and plate to bring the same into clutching relation with one another to compel movement in unison, and means for imparting relative rotary movement to said parts when moved to position to release said parts from inter-engagement in the manner first described.

6. In clutch mechanism of the class described, the combination of an elongated clutch head provided with longitudinally extending grooves and a surrounding clutch plate having members engaging said grooves to permit relative longitudinal movement between said parts and prevent relative rotary movement thereof, said grooves terminating at a predetermined point to release the engagement thus afforded and permit relative rotary movement between the clutch head and plate to bring the same into clutching relation with one another to compel movement in unison, and spring actuated means for imparting relative rotary movement to said parts when moved to position to release said parts from inter-engagement as first described.

7. In clutch mechanism of the class described, the combination of an elongated clutch head and means for imparting reverse longitudinal movements thereto, said head being provided with a groove extending longitudinally in the direction of movement, a clutch plate provided with a member engaging said groove to hold the parts against relative rotary movement and the longitudinal groove of the clutch head terminating in a circumferentially extending groove adapted to permit relative rotary movement between the clutch head and plate to bring the parts into clutching relation to compel longitudinal movement in unison.

8. In clutch mechanism of the class described, the combination of an elongated clutch head provided with a plurality of grooves extending longitudinally in the direction of movement and separated by intervening ribs, a surrounding clutch plate provided with inwardly projecting tongues entering said grooves, the grooved portion of the head terminating in a circumferential groove adapted to permit rotary movement of the clutch plate to bring said projections in alignment with the intervening ribs on the clutch head to clutch the parts together and compel movement in unison.

9. In a die press or the like, the combination of a plunger head and means for guiding the same for reciprocating movements, a constantly reciprocating clutch head freely movable when unclutched with respect to the plunger head, and a clutch plate carried by the plunger head and adapted to freely engage the reciprocating clutch head without permitting rotary movement of the clutch plate save at the terminus of a movement of reciprocation, the clutch head and plate being so configured as to permit rotary movement of the clutch plate at the terminus of said reciprocation to bring the parts into clutching relation and to impart reciprocating movements to the plunger head.

10. In a die press or the like, the combination of a plunger head and means for guiding the same for reciprocating movements, a clutch head mounted for reciprocatory movements and a constantly rotating fly wheel and connections for reciprocating the clutch head, and a clutch plate carried by the plunger head and adapted to freely engage the reciprocating clutch head without permitting rotary movement of the clutch plate save at the terminus of the movement of reciprocation, the clutch head and plate being so configured as to permit rotary movement of the clutch plate at the terminus of said reciprocation to bring the parts into clutching relation and to impart reciprocating movements to the plunger head.

11. In a die press or the like, the combination of a plunger head and means for guiding the same for reciprocating movements, a clutch head mounted for reciprocatory movements and a constantly rotating fly wheel and connections for reciprocating the clutch head, and a clutch plate carried by the plunger head and adapted to freely engage the reciprocating clutch head without permitting rotary movement of the clutch plate save at the terminus of the movement of reciprocation, the clutch head and plate being so configured as to permit rotary movement of the clutch plate at the terminus of said reciprocation to bring the parts into clutching relation and to impart reciprocating movements to the plunger head, spring means for imparting rotary movement to the clutch plate at the terminus of a reciprocation of the clutch head, and means for normally restraining the action of said spring means and adapted to be adjusted to permit such action.

12. In a die press or the like, the combination of a plunger head and means for guiding the same for reciprocating movements, a clutch head mounted for reciprocatory movements and a constantly rotating fly wheel and connections for reciprocating the clutch head, and a clutch plate carried by the plunger head and adapted to freely engage the reciprocating clutch head without permitting rotary movement of the clutch plate save at the terminus of the movement of reciprocation, the clutch head and plate being so configured as to permit rotary movement of the clutch plate at the terminus of said reciprocation to bring the parts into clutching relation and to impart reciprocating movements to the plunger head, spring means for imparting rotary movement to the clutch plate at the terminus of a reciprocation of the clutch head, a trip member for normally restraining the action of the spring means, and means for releasing said trip to permit such action.

13. In a die press or the like, the combination of a plunger head and means for guiding the same for reciprocating movements, a reciprocating frame carrying a clutch head and means for guiding the reciprocating frame and a constantly rotating fly wheel and connections for actuating the reciprocating frame, and a clutch plate carried by the plunger head and adapted to freely engage the reciprocating clutch head, the clutch head and plate being so configured as to permit rotary movement of the clutch plate at the terminus of said reciprocation to bring the parts into clutching relation and to impart reciprocating movements to the plunger head.

14. In a die press or the like, the combination of a plunger head and means for guiding the same for reciprocating movements, a reciprocating frame carrying a clutch head and means for guiding the reciprocating frame, a constantly rotating fly wheel and connections for actuating the reciprocating frame, and a clutch plate carried by the plunger head and adapted to freely engage the reciprocating clutch head without permitting rotary movement of the clutch plate with relation to the clutch head save at the terminus of a movement of reciprocation, the clutch head and plate being so configured as to permit relative rotary movement between the clutch plate and clutch head at the terminus of said reciprocation to bring the parts into clutching relation and to impart reciprocating movements to the plunger head.

15. In a die press or the like, the combination of a plunger head and means for guiding the same for reciprocating movements, a reciprocating member carrying a clutch head and means for guiding the reciprocating member, a constantly rotating fly wheel and connections for actuating the reciprocating member, a clutch plate carried by the plunger head and adapted to freely engage the reciprocating clutch head during its movements of reciprocation, and means for imparting a relative rotary movement between the clutch plate and clutch head at the terminus of a movement of reciprocation to bring the parts into clutching relation and to impart reciprocating movements to the plunger head.

16. In a die press or the like, the combination of a plunger head and means for guiding the same for reciprocating movements, a reciprocating frame carrying a clutch head and means for guiding the reciprocating frame, a constantly rotating fly wheel and connections for actuating the reciprocating frame, and a clutch plate carried by the plunger head and adapted to freely engage the reciprocating clutch head without permitting rotary movement of the clutch plate with relation to the clutch head save at the terminus of a movement of reciprocation, the clutch head and plate being so configured as to permit relative rotary movement between the clutch plate and clutch head at the terminus of said reciprocation to bring the parts into clutching relation and to impart reciprocating movements to the plunger head, and spring means adapted to impart a quick rotary movement to the clutch plate at the terminus of a reciprocating movement of the clutch head.

17. In a die press or the like, the combination of a plunger head and means for guiding the same for reciprocating movements, a reciprocating member carrying a clutch head and means for guiding the reciprocating member, a constantly rotating fly wheel and connections for actuating the reciprocating member, a clutch plate carried by the plunger head and adapted to freely engage the reciprocating clutch head during its movements of reciprocation, and means for imparting a relative rotary movement between the clutch plate and clutch head at the terminus of a movement of reciprocation to bring the parts into clutching relation and to impart reciprocating movements to the plunger head, and spring means adapted to impart a quick rotary movement to the clutch plate at the terminus of a reciprocating movement of the clutch head.

18. In a die press or the like, the combination of a plunger head and means for guiding the same for reciprocating movements, a reciprocating frame carrying a clutch head and means for guiding the reciprocating frame, a constantly rotating fly wheel and connections for actuating the reciprocating frame, and a clutch plate carried by the plunger head and adapted to freely engage the reciprocating clutch head without permitting rotary movement of the clutch plate with relation to the clutch head save at the terminus of a movement of reciprocation, the clutch head and plate being so configured as to permit relative rotary movement between the clutch plate and clutch head at the terminus of said reciprocation to bring the parts into clutching relation and to impart reciprocating movements to the plunger head, spring means adapted to impart a quick rotary movement to the clutch plate at the terminus of a reciprocating movement of the clutch head, and trip means adapted normally to restrain the action of said spring means and adapted to be adjusted to permit said spring means to act.

19. In a die press or the like, the combination of a plunger head and means for guiding the same for reciprocating movements, a reciprocating member carrying a clutch head and means for guiding the reciprocating member, a constantly rotating fly wheel and connections for actuating the reciprocating member, a clutch plate carried by the plunger head and adapted to freely engage the reciprocating clutch head during its movements of reciprocation, means for imparting a relative rotary movement between the clutch plate and clutch head at the terminus of a movement of reciprocation to bring the parts into clutching relation and to impart reciprocating movements to the plunger head, spring means adapted to impart a quick rotary movement to the clutch plate at the terminus of a reciprocating movement of the clutch head, and trip means adapted normally to restrain the action of said spring means and adapted to be adjusted to permit said spring means to act.

EDWARD H. HALL.